March 14, 1933.   W. D. ARCHEA   1,901,489
MACHINE TOOL
Filed Dec. 6, 1929   8 Sheets-Sheet 1

Inventor
WALTER D. ARCHEA
By H. K. Parsons
Attorney

March 14, 1933. W. D. ARCHEA 1,901,489
MACHINE TOOL
Filed Dec. 6, 1929 8 Sheets-Sheet 2
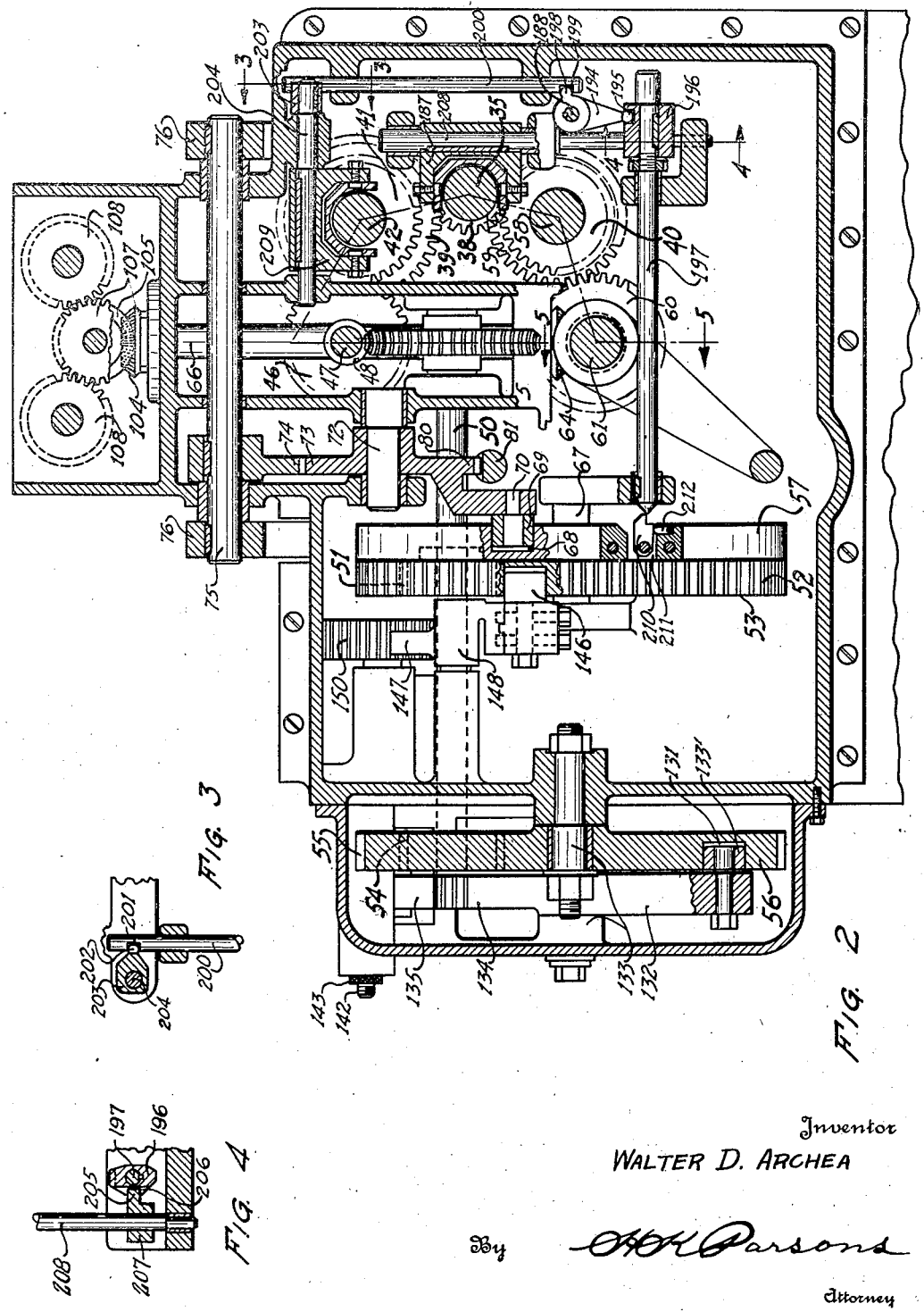

March 14, 1933. W. D. ARCHEA 1,901,489
MACHINE TOOL
Filed Dec. 6, 1929 8 Sheets-Sheet 3

Inventor
WALTER D. ARCHEA

By A. H. K. Parsons
Attorney

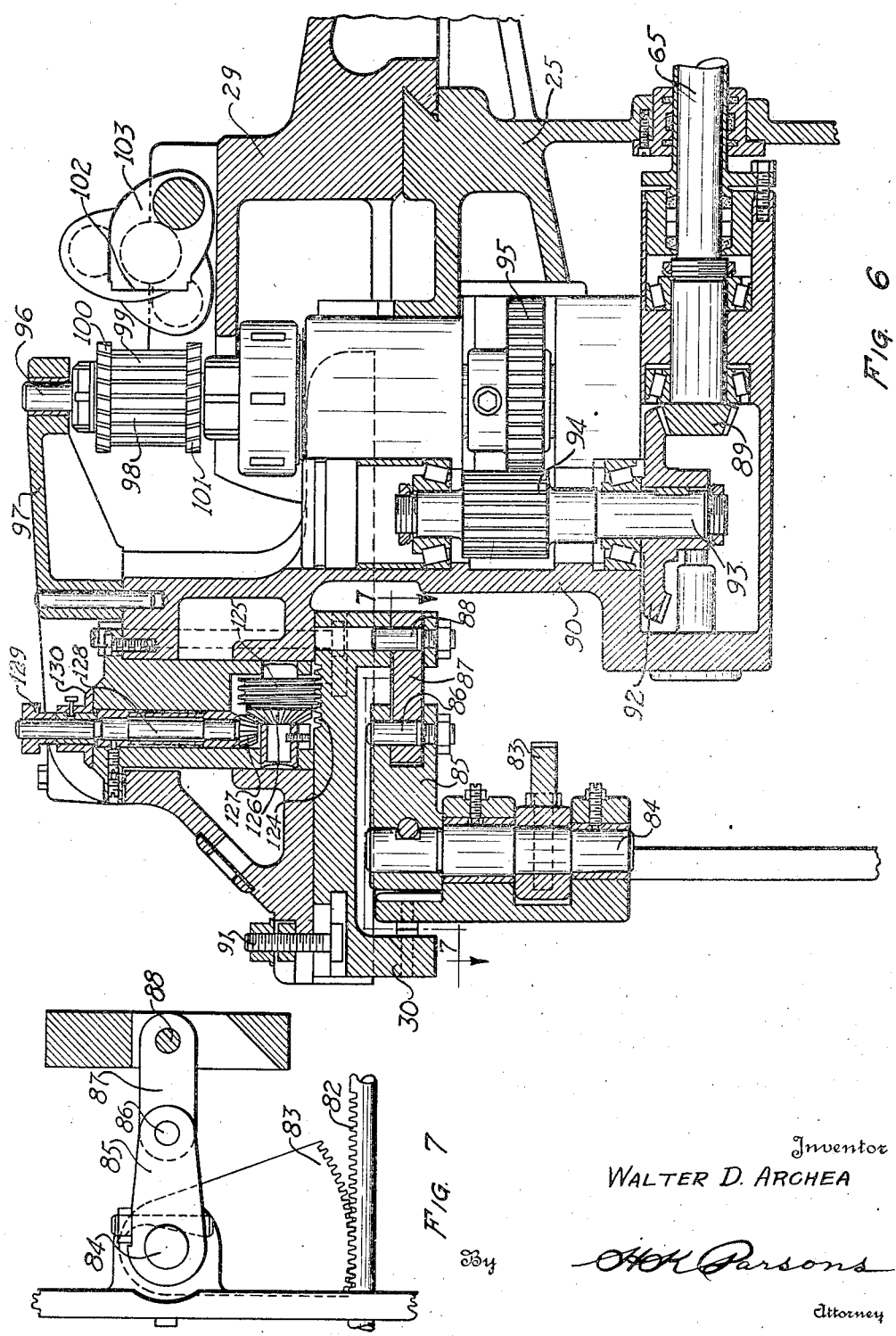

March 14, 1933. W. D. ARCHEA 1,901,489
MACHINE TOOL
Filed Dec. 6, 1929 8 Sheets-Sheet 5

Inventor
WALTER D. ARCHEA
By HKParsons
Attorney

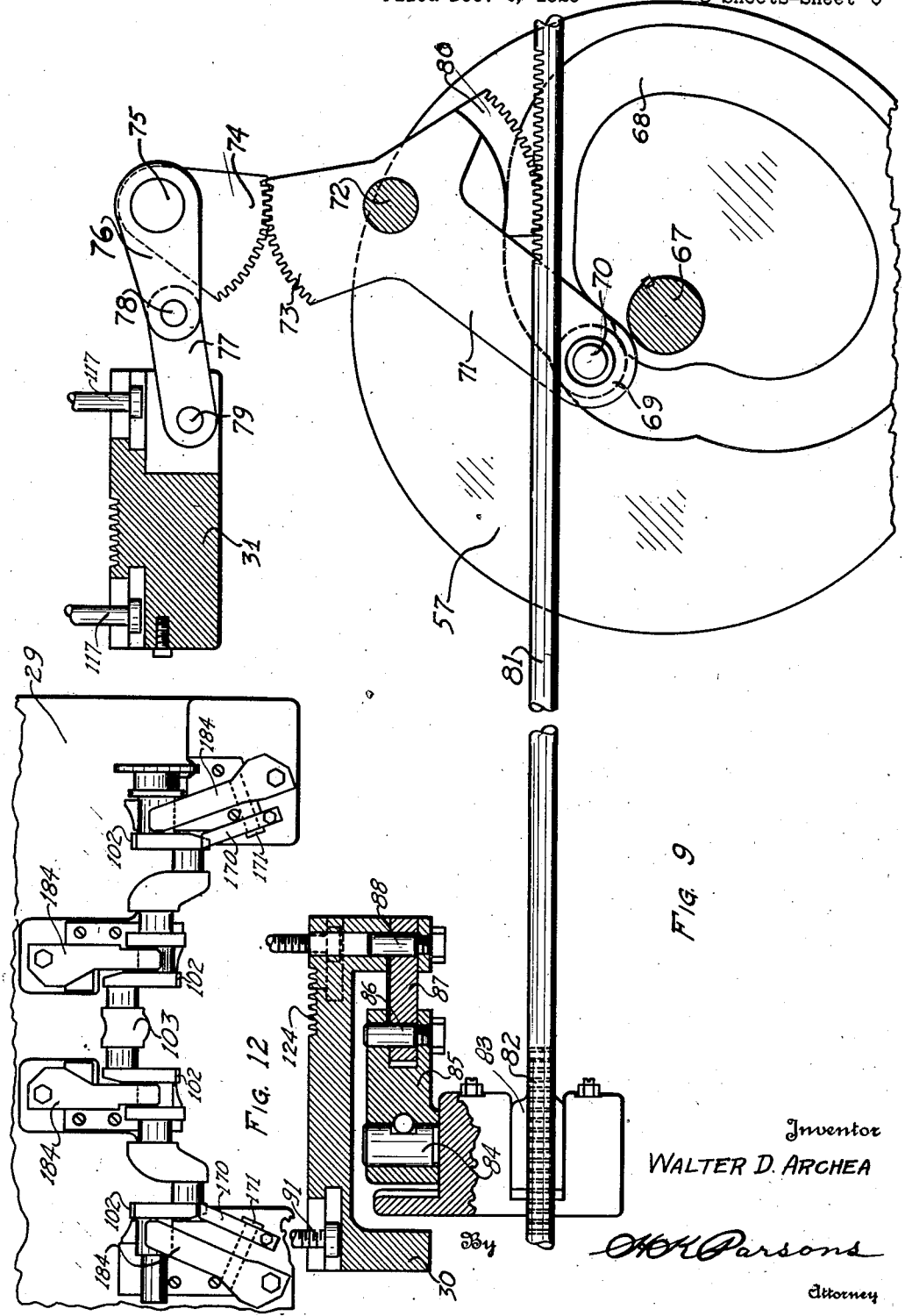

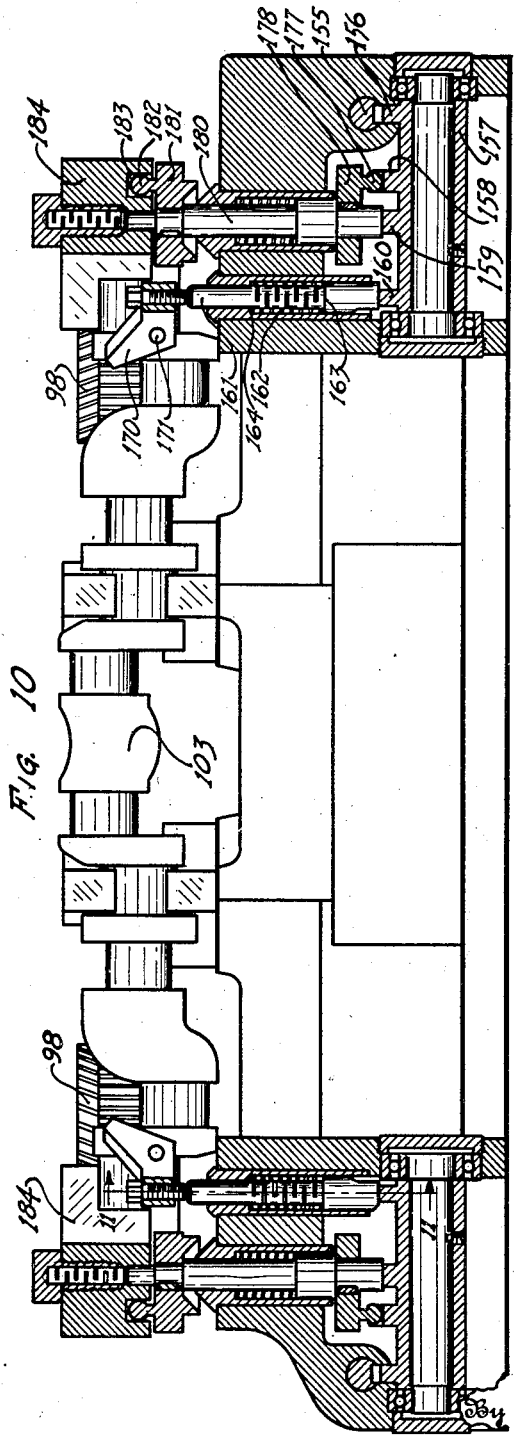
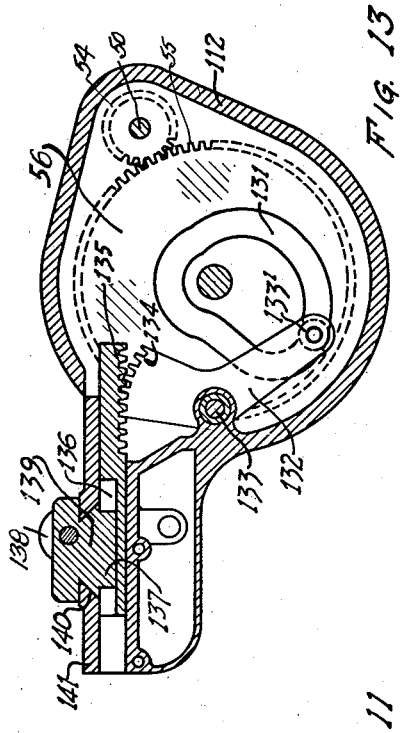
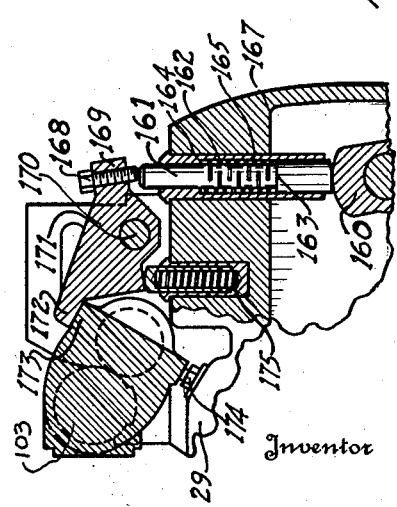

March 14, 1933. W. D. ARCHEA 1,901,489
MACHINE TOOL
Filed Dec. 6, 1929 8 Sheets-Sheet 8
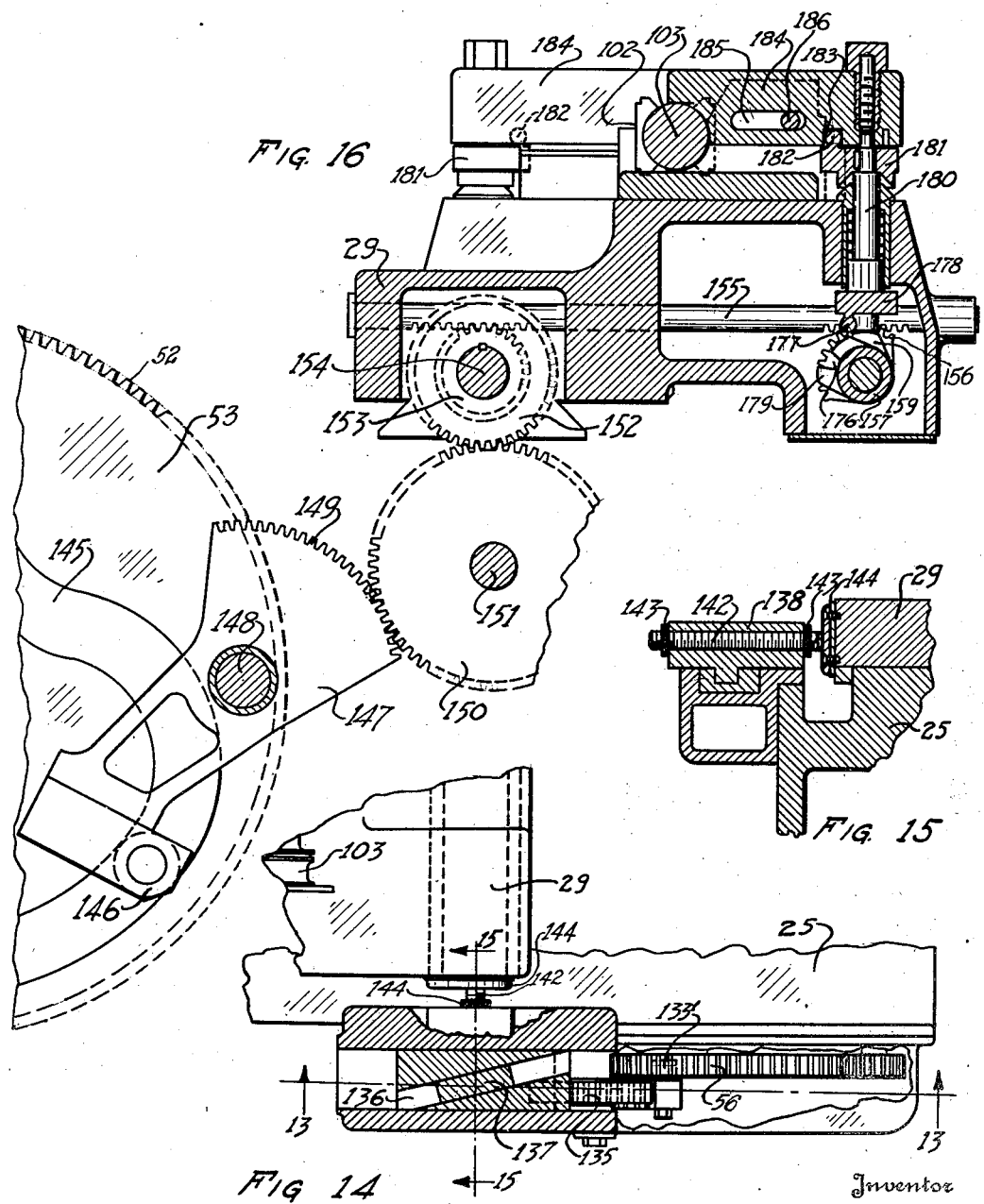
Inventor
WALTER D. ARCHEA Patented Mar. 14, 1933

1,901,489

UNITED STATES PATENT OFFICE

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO

MACHINE TOOL

Application filed December 6, 1929. Serial No. 412,243.

This invention relates to improvements in milling machines and especially to milling machines having a predetermined cycle of operation.

An object of this invention is to provide improved mechanisms for controlling the cyclic operations of an automatic milling machine.

Another object of this invention is to provide in a machine of this type, improved mechanism for simultaneously performing a plurality of operations on a work piece.

Another object of this invention is to provide a milling machine for simultaneous operation on a plurality of angularly related portions of a work piece and for finishing a plurality of surfaces on each portion of said work piece.

Another object of the invention is to provide in a machine tool, improved mechanisms for controlling the actuation of the parts thereof to simultaneously perform a series of angularly related operations on a plurality of portions of a single work piece.

Another object of this invention is to provide a machine tool for operation on an irregularly shaped work piece having a plurality of angularly related surfaces to be operated upon, embodying improved mechanisms for properly positioning said work piece to present said surfaces to the cutting tools carried by the machine.

A further and specific object of this invention is to provide an automatic milling machine for completely finishing the plurality of counterweight seats on an internal combustion engine crankshaft at one setting thereof.

Further objects and advantages of the present invention should be readily understood by referring to the following specifications, considered in conjunction with the drawings forming a part thereof, and it is to be understood that any modifications may be made in the exact structure hereinafter described, within the scope of the appended claims, without departing from or exceeding the spirit of the invention.

Figure 2 is a sectional view through the rear of the machine, showing the drive;

Figure 3 is a fragmentary sectional view taken on line 3—3 of Figure 2;

Figure 4 is a fragmentary sectional view taken on line 4—4 of Figure 2;

Figure 6 is a fragmentary sectional view taken on line 6—6 of Figure 1;

Figure 7 is a sectional view taken on line 7—7 of Figure 6;

Figure 9 is a semi-diagrammatic view of the mechanism for operating the front and rear slides supporting the cutter spindles.

Figure 10 is a transverse section of the machine illustrating the supporting table for the work piece.

Figure 11 is a sectional view taken on line 11—11 of Figure 10;

Figure 12 is a top plan view of the mechanism disclosed in Figure 10;

Figure 13 is a sectional view through the control mechanism for transversely shifting the work support.

Figure 14 is a plan view of one end of the work supporting table, parts of which are shown in cross section.

Figure 15 is a sectional view taken on line 15—15 of Figure 14; and

Figure 16 is a sectional view illustrating the control mechanism for clamping the work pieces on the work support.

Throughout the several views of the drawings, similar reference characters are employed to denote the same or similar parts.

Figure 1:
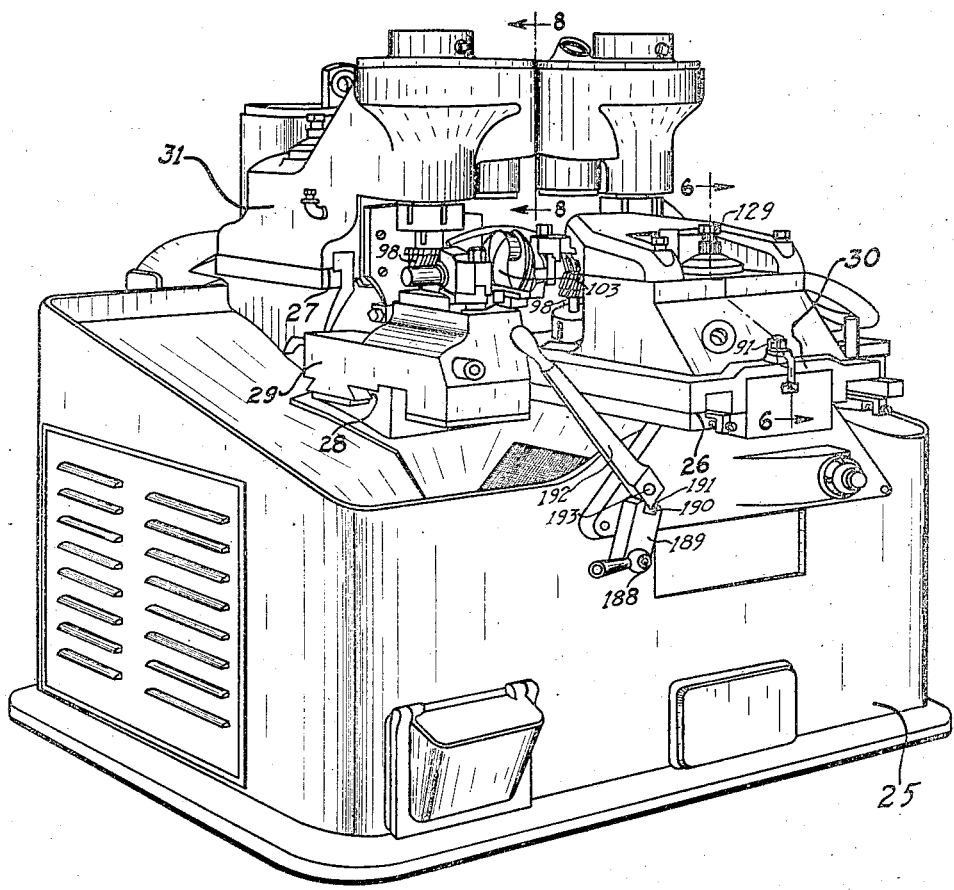
Figure 1 is a perspective view of a machine embodying this invention.

In the drawings, the numeral 25 designates the bed having rising therefrom ways 26 and ways 27 spaced from one another and respectively positioned adjacent the front and rear ends of the machine. Extending transversely of the bed and intermediate ways 26 and 27 is a third set of ways 28 for the work support or table 29. A front spindle carrier 30 is mounted on the ways 26 and adapted for movement toward and from the table 29. A similar spindle carrier 31 is mounted on ways 27, likewise movable toward and from the work support or table 29.

Figure 5:
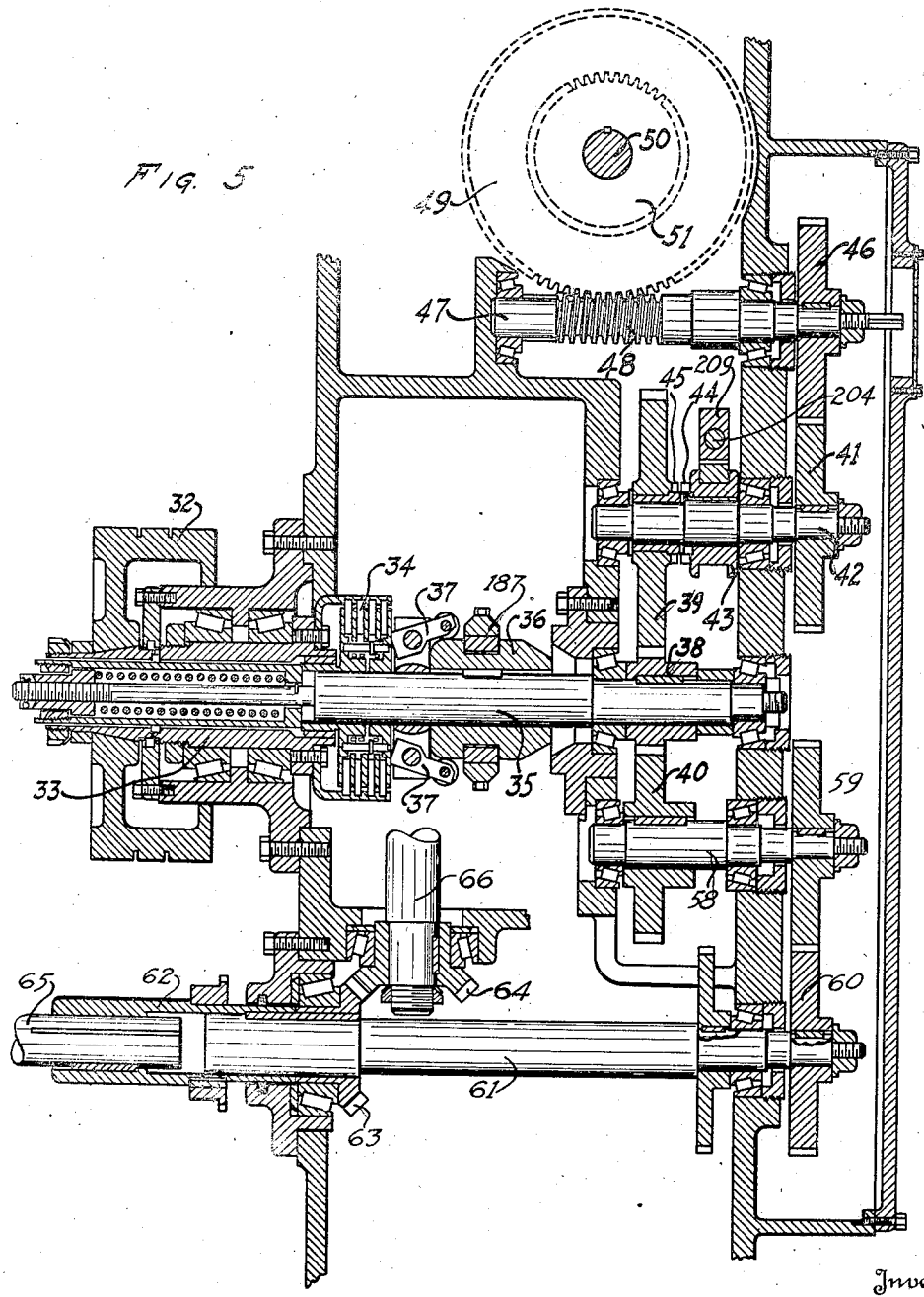
Figure 5 is a development of the drive taken on line 5—5 of Figure 2.
Figure 8:
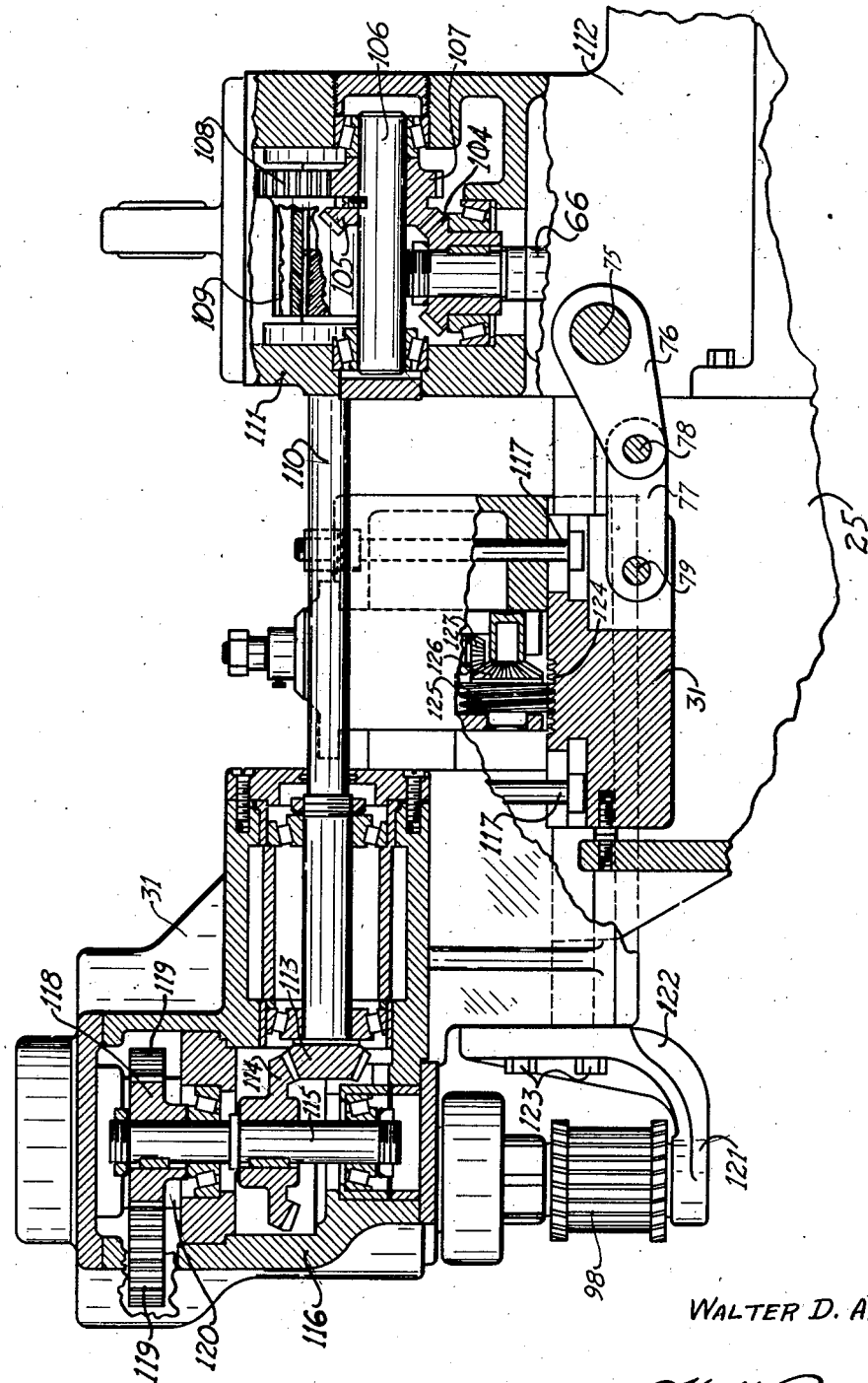
Figure 8 is a sectional view through the rear carriage and spindle as on line 8—8 of Figure 1.

Referring now to Figures 2 and 5, the mechanism for driving the above mentioned spindle carriers and table will be described. Suitable power, whether from an individual motor, line shaft, countershaft, etc., is utilized for rotating the pulley or gear 32 mounted on one end of main drive shaft 33. A separable friction disc clutch 34 is employed having one member thereof secured to the shaft 33 and the other member secured to the driven shaft 35. Slidably keyed to the shaft 35 is a clutch spool 36 for operating clutch fingers 37 to establish a driving connection between driving shaft 33 and driven shaft 35. Mounted on the other end of the driven shaft 35 is a pinion 38 enmesh with a pair of gears 39 and 40. Gear 39 is utilized for driving the cams which control the movement of the various spindle carriers and work supporting table, while gear 40 drives the spindles for operation upon the work piece.

The train or transmission line to the cams include the gear 41 mounted upon a short shaft 42, upon the opposite end of which is the gear 39, which is loosely mounted on said shaft while gear 41 is keyed thereto. The shaft 42 is connected with gear 39 by the shiftable clutch 43 whose teeth 44 are adapted to engage teeth 45 on said gear 39.

Gear 41 is meshed with a gear 46 fast on worm shaft 47 which has integral therewith or secured thereto the worm 48 in driving connection with a worm wheel 49. This worm wheel 49 is keyed to shaft 50, which has, in addition, keyed thereon intermediate its ends, a pinion 51 enmesh with gear teeth 52 formed on disc cam 53. A second pinion 54 is carried by the end of shaft 50 and engages teeth 55 on a second disc cam 56. Disc cam 53 has secured to its rear face a disc cam 57 and moves with cam 53 being driven by the said pinion 51. Disc cam 53 is employed for operating the clamping mechanism for clamping the work piece to the work support or table, while cam 57 is utilized for actuating spindle carriers 30 and 31 toward and from the work piece support or table, and disc cam 56 controls the back and forth movement of the work piece support or table.

The mechanism for rotating the spindles includes the gear 40, keyed or secured to a short shaft 58, which is driven from the aforementioned pinion 38 on driven shaft 35. A gear 59 is secured to the other end of shaft 58 and meshes with a pinion 60 on shaft 61 which telescopes within a sleeve 62 having formed on one end thereof a bevel pinion 63 enmesh with a second bevel pinion 64. The sleeve 62 is keyed to the shaft 61 and is driven by the rotation of said shaft and has telescoped into its other end a shaft 65 which extends to the gears for driving the rear spindles, which will be described in detail later. Likewise, bevel pinion 64 is keyed to a vertical shaft 66 which leads to the gears for driving the rear spindles, which will also be described in detail later.

From the foregoing, it will be noted that a single prime mover is employed for rotating the spindles, as well as for controlling the actuation of the various spindle slides and work carrying table.

Cams 53 and 57 are secured to a common shaft 67 to move as a unit, and cam 57 is provided with a cam track 68 in which a roller 69 is positioned, the roller being supported by a stud 70 carried by one end of arm 71. This arm 71 is adapted to be oscillated about pivot 72 and is provided with a segmental gear 73 which is enmesh with a second segmental gear 74 keyed or otherwise secured to stub shaft 75 which also has secured to it a lever 76. A link 77 has one end pivoted at 78 with the lever 76 and the other end pivoted at 79 with the rear spindle carrier 31. Integral and movable with arm 71 and segment 73 about the pivot 72 is a segmental gear 80 meshing with rack teeth formed in one end of rack bar 81. This rack bar 81 extends from the rear of the machine to the front thereof and is provided at the forward end with rack teeth 82 enmesh with a segment 83 fast on a pivot pin 84. A lever 85 is also secured to the pin 84 and has one end pivotally connected at 86 with a link 87, which link has its other end pivoted at 88 with the carriage 30 of the forward spindle carrier.

From the foregoing description it will be noted that, as cam disc 57 is rotated, the end of the arm 71 carrying the roller 69 will be oscillated toward and from the center of shaft 67. This oscillation through segmental gears 73 and 80 respectively oscillates segmental gear 74 and shift rack bar 81. Oscillation of segmental gear 74 through the toggle joint, which includes lever 76 and link 77, moves the rear spindle carrier toward and from the work supporting table 29. Likewise, axial shifting of the rack bar 81 through the segmental gear 83 and its toggle joints 85 and 87 shifts the forward spindle carrier 30.

Prior to the movement of the spindle carrier, the spindles and cutters carried thereby are rotated, and the means for so doing will now be described. Telescopic shaft 65 (see Figure 6) has secured to its forward end a bevel pinion 89 suitably journaled in anti-friction bearings carried in the lower part of spindle housing 90, which housing is in turn secured by means of bolt and nut connections 91 to the forward spindle carrier 30. Bevel pinion 89 meshes with a bevel gear 92 keyed or secured to pinion shaft 93 which carries a pinion 94 intermediate its ends. Pinion 94 meshes with a pair of gears 95, which gears are each carried by or secured to a spindle 96. But one of the spindles and cutters has been illustrated, which is deemed sufficient since both spindles are duplicates of one another. The spindle 96 has its lower end suitably journaled in the lower part of the housing 90 and its upper end in an arm or an overhanging portion 97 of the spindle housing 90. A cutter 98, having a central cylindrical body portion 99 flanked on each end by a collar 100 and 101 each provided with suitable teeth for milling the seat 102 on the work piece 103, is carried and rotated by each spindle 96.

The work piece here illustrated is a crankshaft for use in internal combustion engines and the like on which the seats 102 are milled to receive a formed counterweight having a complementary seat which is secured to said crank-shaft work piece.

The rear spindles are driven in a similar manner to that just described for driving the front spindles and this mechanism includes the vertical shaft 66 which has secured or keyed to its upper end a bevel pinion 104 enmesh with a similar bevel pinion 105 secured to a stub shaft 106. Integral with the bevel pinion 105 is a spur pinion 107 meshing with a gear 108 from which a sleeve 109 extends. A telescopic shaft 110 is received in the sleeve 109 and driven thereby. The mechanism just described is enclosed in a housing 111 mounted on the bed 25 above the housing 112 in which the transmission gearing and main starting clutch are housed. Integral with or secured to the forward end of shaft 110 is a bevel pinion 113 enmesh with a bevel gear 114 keyed or secured to stub shaft 115 journaled in suitable anti-friction bearings mounted in the spindle housing 116 secured to rear spindle slide 31 by means of suitable bolts and nuts 117. Keyed to shaft 115, so as to rotate therewith, is a pinion 118 enmesh with a pair of gears 119 each carried by a spindle 120. The spindles being similar in construction, only one of them has been illustrated and will be described.

One end of the spindle 120 is journaled in the housing 116 while the other end is journaled in an arm 121 extending from a bracket 122 secured by cap screws or the like 123 to the lower part of the housing 116.

From the foregoing it will be understood how the rear spindles are rotated and also that the same common pinion 38 derives its power from the common prime mover to the pulley 32 for rotating both the rear spindles and both of the front spindles simultaneously. In setting up the machine for use on different sizes or kinds of work pieces, it is desirable that the spindles and housings carrying same have a movement relative to and independent of the carriers 30 and 31. Since the means for adjusting the spindles relative to the carriers is common to both, it is deeemd sufficient that but one of them be described. Accordingly, and referring to Figure 6, it will be noted that the upper surface of spindle carrier 30 is provided with rack teeth 124 engaged by the teeth of worm 125, which has integral therewith a bevel gear 126 meshing in turn with a bevel pinion 127. Bevel pinion 127 is integral with or secured to a shaft or spindle 128 having a knob or other suitable actuating member 129 secured to its upper end. A dial 130 may be used for determining the amount of rotation of the shaft 128 and consequently the worm 125.

In the operation of the adjusting mechanism, bolt and nut 91 would be loosened, whereupon power would be applied to the actuating knob 129 for rotating pinion 127, gear 126 and worm 125. Worm 125 would act as a screw and tend to threadedly advance along the threads of rack teeth 124 and since the spindle carrier 30 would be held stationary, the entire housing 90, including the spindles and cutter 98, would be advanced toward the work 103 relative to the spindle carrier 30.

Referring now to the mechanism for shifting the work piece support or table including the cam disc 56, which is provided with a cam groove 131 so related to cam groove 68 in disc 57 that after the cutters have been advanced by the cam groove 68 to the limit of their movement toward the work table, arm 132 carrying roller 133' engaged within the groove 131 is oscillated in a clockwise direction (see Figure 13) about pivot pin 133 carried by housing 112. This arm 132 is provided on its other end with a gear segment 134 enmesh with a rack bar 135. As the cam disc 53 rotates, the rack bar 135 is reciprocated for feeding the table or work support laterally of the bed. To this end, rack bar 135 is provided with a diagonal groove 136 which receives a tongue 137 depending from a cylindrical shaped member 138. Member 138 is provided with a dovetailed tongue 139 received and guided by a complementary dovetailed way 140 in the top plate 141. A connecting pin 142 extends through the cylindrical member 138 and is locked in position by lock nuts 143. The connecting pin 142 is provided on its one end with a flange 144, through which fastening means extend for securing the connecting pin 142, cylindrical member 138 and tongue 139 to the table or work support member 29.

From the foregoing it will be observed that the cam 56 is utilized for shifting the table or work support 29 laterally across the bed 25 and that the relation of the cam grooves on cam discs 56 and 57 is such that the table is held stationary until after the cutters have been moved toward the work piece to the limit of their travel and determining the depth of cut to be made.

The cam 53, as was stated above, is utilized for centering and clamping the work piece to the table or work support after it has been placed thereon. The mechanism for so doing includes the said cam 53 having formed therein a groove 145 in which roller 146 carried by one end of arm 147 rides. The arm 147 is pivotally mounted to oscillate about pivot 148 and is provided on its one end with a segmental gear 149 enmesh with a gear 150 carried by shaft 151. Gear 150 meshes with a compound gear 152, which has integral therewith pinion 153 and which is keyed or otherwise secured to a shaft 154.

The shaft 154 extends the length of the table 29 and has on its other end a gear similar to the gear 153 and is utilized for operating a similar mechanism. The clamping and centering mechanisms are mounted on each end of the table and are actuated from the shaft 154. Since these mechanisms are duplicates of one another, it is deemed sufficient if but one of them be described.

The pinion 153 engages the teeth on one end of rack bar 155 while the other end of rack bar 155 meshes with a segmental gear 156 integral with a sleeve 157 (see Figure 10). The sleeve 157 is provided with three integral cams 158, 159 and 160. The cam 160 (see Figure 11) is adapted to engage and upwardly shift a plunger 161 against the yielding resistance of a spring 162, which has one end in abutment with shoulder 163 formed on plunger 161 and the other end abutting a shoulder 164 formed in guide sleeve 165. Guide sleeve 165 is carried by housing 167 secured to the end of the table. Plunger 161 abuts at its upper end an adjusting screw 168 which extends through one end 169 of arm 170, which is pivoted at 171. The other end 172 of the arm is formed to engage one side of flange 173 formed on work piece 103 and is adapted to force the other side of said flange 173 into engagement with an adjustable stop screw 174 adjustably received in table 29 and locked in position by the lock nut. A yielding spring pressed plunger 175 tends to rotate or lift the arm 170 about its pivot in a clockwise direction away from the positioning flange 173. It will be noted that cam 160 has a concentric portion at the end of its throw, so that continued rotation of sleeve 157 will have no effect on the arm 170 after it has positioned the work piece to the desired point. During this positioning of the work piece, cams 158—159 are rotating but due to their concentric portions, no result is accomplished.

At this time, however, the notch 176 (see Figure 16) formed in the cam 158 is immediately beneath the boss 177 formed eccentric on disc 178. Continued rotation of sleeve 157 causes shoulder 179 to engage the eccentric boss 177 to rotate the disc 178. This disc 178 is keyed or otherwise fastened to a vertical shaft 180 having secured to its upper end a similar disc 181 provided with an eccentric lug 182 received in the pocket 183 formed in clamp arm 184. Clamp arm 184 has an elongated perforation 185 therein, through which guide pin and pivot 186 extends. From the foregoing it will be noted that when the shoulder 179 engages the eccentric lug 177, the shaft 180 is rotated and the clamp bar axially shifted through the engagement of the eccentric lug 182 therewith. After the clamp arm has been shifted toward the work, the desired amount, cam 159 engages the lower end of the shaft 180, raising same and actuating the clamp arm about the pivot guide pin 186 in a counter-clockwise direction, as viewed in Figure 16, to cause said arm to engage and clamp the work piece against the table which supports same. The axial shifting of the clamp arm 184 toward and from the work piece is necessary so that the work pieces may be expeditiously inserted and removed from the machine.

It is now evident how the work pieces are placed in the machine and clamped in proper predetermined position relative to the cutters by means of a cam. It is also evident how the cutters and supporting means are actuated toward one another and toward the work piece on the table to perform a given operation or series of operations upon the work piece. It has also been described how the third cam causes the table to be laterally actuated relative to the cutters for performing a second operation or series of operations or for completing the operation previously performed by the cutter.

In practice, a prime mover not shown is constantly rotating the pulley or gear 32 and shaft connected therewith. The clutch spool 36, for engaging the main driving clutch, is provided with a yoke 187 for shifting same, which yoke is adapted to be actuated through shaft 188 (see Figure 1), from which a shifter link 189 extends. The shifter is provided with a notch 190, to receive the tongue 191 formed on the end of starting lever 192 which pivots about pivot 193. Mounted on the other end of shaft 188 is an arm or bell crank 194 having a ball and socket connection as at 195, with a shifter member 196 secured on shifter shaft 197. The arm 194 is further provided with a lug 198 received in socket 199 formed in vertical shifter shaft 200. The other end of shaft 200 is provided with a socket 201 similar to socket 199, for receiving a lug 202 on arm 203 secured to oscillatable shaft 204. Shaft 204 has mounted thereon the shifter yoke 209 for shifting clutch spool 43 which controls the rotation of worm wheel shaft 50 and cams rotated thereby. Shifter member 196 is provided with a projection 205, received in slot 206 in connecting member 207 fast on an oscillating or rocking shaft 208, which rock shaft has secured to it shifter yoke 187 for shifting the main clutch spool 36. From the foregoing it will be noted that the starting lever 192 is employed for engaging the main friction disc clutch, as well as the clutch controlling the transmission gearing extending to and driving the main control cams.

The device is so constructed that after the completion of a work piece, the machine stops. In other words, a single cycle is performed, at which time all parts are stopped and the different members brought to their original or starting positions. The means for accomplishing this is shown in Figure 2 and includes a pivoted dog 210 arranged to be oscillated within a socket 211 formed in the periphery of the disc cam 57. A suitable spring loaded plunger 212 serves to hold the dog in its normal position. As the cam rotates, the dog 210 is adapted to engage the tapered end of shifter shaft 197, which is positioned in the path of said dog 210 in order to shift same to the right for disengaging the clutch spool 36 and clutch member 42 for cutting off all power to the machine and stopping same, other than the main driving gear or pulley 32.

The operation of the machine is as follows:

A work piece is placed on the work supporting table in substantially the relation in which it is to be presented to the cutting tools. The starting lever 192 is then manually actuated about its pivot for rocking the shaft 188 which carries the bell crank 194. This axially shifts the rod 197 to the left, as seen in Figure 2, moving the end thereof toward the cam 57 and into the path of the dog 210. At the same time, the shifter forks 187 and 209 shift the clutch spools into engagement with the main starting clutch 34. Through the train of gears extending from the main drive shaft, the cam shaft 50 is rotated, setting in motion the various control cams. The relation of the cam tracks to one another is such that the centering and clamping mechanism is first set into operation, causing the work piece to be accurately positioned relative to the cutting tools and clamping same in said position. At this time, the cutting tool slides are actuated toward one another and toward the work supporting table, for feeding the tools into the work piece. After the tools have been advanced to the limit of their movement, the controlling cam for the work supporting table causes said table to move transversely of the tools and slides supporting same for completing the cut longitudinally of the work piece. It will be understood that the tools are rotated prior to the engagement thereof with the work piece. After the table has moved to the limit of its movement, the cam will retract it to its initial position, while the remaining cams also retract the rotating tool slides and unclamp the work piece on the table. At this time, the various cams have made one complete revolution and the dog 211 is about to engage and shift the shifter rod 197. As soon as the shifter rod 197 has been shifted to the right, as seen in Figure 2, the clutches are disengaged and all power cut off to the machine, thereby allowing same to stop.

The finished work piece is now removed and another piece placed on the table, whereupon the starting lever is again shifted for initiating a repetition of the cycle just described.

Attention is invited to the fact that the cam grooves have such a contour as to cause rapid movement of the cutters to a cutting position and then at a feed rate to effect the depth of cut. The table is then fed longitudinally to effect the length of cut. The table actuating cam is contoured to effect a rapid return of the table to a starting position at the finish of the cut and the actuating cam for the spindle carriers is also contoured to effect a rapid withdrawal of the cutters to a starting position at that time.

What is claimed is:

1. In a milling machine the combination of a bed, a plurality of slides carried by the bed movable toward and from one another, rotating cutter tools carried by the slides, a work table carried by the bed intermediate the slides and movable transversely of the slides, a common means for effecting rotation of the tools and movement of the slides and work table in timed sequential cyclic order to effect a milling operation, and means automatically effective at the completion of said operation to return the movable parts to a starting position.

2. In a milling machine having a given cycle of operation the combination of a bed, a plurality of slides carried by the bed movable toward and from one another, rotating cutter tools carried by the slides, a work table carried by the bed intermediate the slides for movement transversely thereof, means for effecting rotation of the spindles and movement of the slides and the work table in timed sequential cyclic order to effect a milling operation, means automatically effective at the completion of said operation to return the movable parts to a starting position, and means for stopping rotation of the tools and movement of the slides and table at the completion of each cycle.

3. In a milling machine having a given cycle of operation the combination of a bed, a plurality of slides carried by the bed movable toward and from one another, rotating cutter tools carried by the slides, a work table carried by the bed intermediate the slides movable transversely of the slides, means for effecting the rotation of the tools and movements of the slides and work table in timed sequential order, means for stopping the rotation of the tools and movements of the slides and table at the completion of each cycle, and additional means including a manually operated starting lever for initiating a repetition of the cycle.

4. In a milling machine the combination of a bed, a work supporting table thereon, a slide carried by the table for supporting a rotating tool and movable toward and from the table, and means for effecting the reciprocation of said slide including a rotating disc cam, an oscillating arm operatively connected with the cam and a toggle having one end pivotally secured to the slide and the other end operatively connected to the oscillatable arm.

5. In a milling machine the combination of a bed, a work supporting table thereon, a pair of slides carried by the bed one on each side of the table and each reciprocable toward and from the table, and means for reciprocating the slides, said means including a rotating cam, an oscillatable arm operatively connected with the cam, a segmental gear on said arm, a reciprocating rack bar connected with the segmental gear, a second oscillatable arm having a segmental gear operatively connected with the rack bar, and a pair of toggles each toggle having one end connected to one slide and the other end operatively connected to one of the oscillatable arms.

6. In a milling machine the combination of a bed, a pair of slides carried by the bed movable in a direction toward and from one another, means including a unidirectional rotatable cam for positively actuating the slides in both directions, a work supporting table intermediate the slides movable transversely of the slides, and means including a second unidirectional rotating cam for positively actuating the table in both directions.

7. In a milling machine the combination of a bed, a work supporting table carried thereby and reciprocable transversely thereof, a slide on each side of the bed reciprocable in a direction toward and from the table, rotating cutter tools carried by each slide, rotating cams for effecting reciprocation of the slides and table, a common drive shaft, a pair of parallel transmission lines extending from the drive shaft, one line for rotating the cutter tools and the other line for rotating the cams.

8. In a milling machine the combination of a bed, a pair of slides carried thereby and adapted to be reciprocated toward and from one another, rotating cutter tools carried by the slides, a work supporting table intermediate the slides and movable transversely of the slides for supporting a work piece in substantial relation to the cutter tools, means for adjusting and centering the work piece relative to the cutter tools, and means for clamping the work piece in its final position.

9. In a milling machine the combination of a bed, a work supporting table carried by the bed for reciprocation transversely thereof, and means for finally positioning and clamping the work piece on the table, said means including a reciprocating rack bar, an oscillatable shaft operatively connected with the rack bar, a plurality of cams carried by the shaft, a pivoted centering arm operably connected with one of the cams for finally positioning the work piece, and a slidable pivoted clamp arm operatively connected with another of the cams for clamping the work piece in its final position.

10. In a machine tool organization the combination of a bed, a table carried by the bed and movable transversely thereof, a slide on either side of the table and reciprocable toward and from the table, means on the table for centering and clamping a work piece thereto, a cam for effecting movement of the table, a second cam for effecting movement of the slides, a third cam for actuating the centering and clamping mechanisms, and a common actuator for effecting the rotation of the cams in unison.

11. In a machine tool organization the combination of a bed, a table carried by the bed and movable transversely thereof, means supporting rotating tools carried by the bed and movable toward and from the table, and means effecting movement of the table including a rotating cam, a pivoted arm adapted to be oscillated about its pivot by the cam, a segmental gear carried by the arm, a slide reciprocable by the segmental gear having an angularly formed way therein, and a tongue depending from the table interfitting with the way in the slide whereby movement of the slide in one direction causes movement of the table in an angularly related direction.

12. In a machine tool organization the combination of a bed, members reciprocably carried by the bed for movement in angularly related directions, rotating cutter tools carried by certain of the members, a common actuator, transmission gearing extending from the common actuator to the reciprocable members and rotating cutter tools, and means including a clutch for connecting and disconnecting the common actuator from the transmission gearing and a manually operable lever for shifting the clutch to operatively connect the common actuator with the transmission gearing.

13. In a machine tool organization the combination of a bed, members reciprocably carried by the bed for movement in angularly related directions, rotating cutter tools carried by certain of the members, a common actuator, transmission gearing extending from the common actuator to the reciprocable members and rotating cutter tools, means including a shiftable clutch for connecting the common actuator with the transmission gearing, a cam for effecting reciprocation of the members operated by the transmission gearing, a shifter for the clutch, manual means for operating the shifter to connect the common actuator with the transmission gearing, and means carried by the cam operatively connected with the clutch shifter for disconnecting the clutch at the completion of a single revolution of the cam.

14. In a machine tool organization the combination of a bed, members reciprocably carried by the bed for movement in angularly related directions, rotating cutter tools carried by certain of the members, a common actuator, transmission gearing extending from the prime mover to the reciprocable members and rotating cutter tools, means including a clutch for connecting and disconnecting the common actuator from the transmission gearing and a manually operable lever for shifting the clutch to operatively connect the common actuator with the transmission gearing, and automatic means shifting the clutch for disconnecting the common actuator from the transmission gearing.

15. In a machine tool organization the combination of a support, a work supporting table carried thereby and movable transversely thereof, means supporting rotating tools movable toward and from the work supporting table, means automatically centering and clamping a work piece on the table, and means including a plurality of cams for effecting the reciprocation of the table and tool supporting means so related that the members are rapidly brought into operative position slowly fed to properly finish a work piece and rapidly retracted to normal inoperative position.

16. In a machine for milling crankshaft counterweight seats the combination of a work table and a plurality of cutter spindles on opposite sides thereof, means to support and position a crankshaft on the table in predetermined angular relation with respect to the cutter spindles, the spindles on one side of said crankshaft being spaced to flank the spindles on the other side, means to feed the cutter spindles normal to the axis of the work to determine the depth of said seats, automatic means effective after the determination of said depth to effect relative movement between the work and spindles to effect lengthwise milling of the seats, and additional means to return the parts to starting position.

17. In a milling machine the combination of a bed, a pair of slides carried thereby and adapted to be reciprocated toward and from one another, rotating cutter tools carried by the slides, a work supporting table intermediate the slides and movable transversely thereof for supporting a work piece carried thereby to the action of the cutter tools, power actuated mechanism for reciprocating the slides and work table in predetermined order, and means for adjusting and centering a work piece on the table relative to the cutter tools, said means being coupled to said mechanism for automatic operation thereby prior to reciprocation of the slides.

18. In a machine for milling crankshaft counterweight seats the combination of a work table and a plurality of cutter spindles on opposite sides thereof, a work holder on the table adapted to receive and support a crankshaft, means for finally positioning and clamping the crankshaft to the table so that each counterweight seat thereof will be adjacent an individual cutter, means to feed the cutters normal to the axis of the work to determine the depth of said seats, means to traverse the cutters relative to said seats to finish the same, means to return the parts to starting position, and power operated mechanism for actuating all of said means sequentially in the order recited.

19. In a machine for milling crankshaft counterweight seats the combination of a work table and a plurality of cutter spindles on opposite sides thereof, a work holder on the table adapted to receive and support a crankshaft, means for finally positioning and clamping the crankshaft to the table so that each counterweight seat thereof will be adjacent an individual cutter, means to feed the cutters normal to the axis of the work to determine the depth of said seats, means to traverse the cutters relative to said seats to finish the same, means to return the parts to starting position, and one revolution mechanism for actuating all of said means sequentially in the order recited during one revolution of the mechanism.

20. In a machine for milling crankshaft counterweight seats the combination of a work table and a plurality of cutter spindles on opposite sides thereof, a work holder on the table adapted to receive and support a crankshaft, means for finally positioning and clamping the crankshaft to the table so that each counterweight seat thereof will be adjacent an individual cutter, means to feed the cutters normal to the axis of the work to determine the depth of said seats, means to traverse the cutters relative to said seats to finish the same, means to return the parts to starting position, a source of power, one revolution mechanism for actuating all of said means sequentially in the order recited during one revolution of the mechanism, manual means for coupling the mechanism to said source of power, and automatic means for disconnecting said mechanism after one revolution thereof.

In testimony whereof I affix my signature.

WALTER D. ARCHEA.